A. J. LIEBMANN AND C. A. LAISE.
HARDENED MATERIAL FOR USE IN THE ARTS AS SUBSTITUTES FOR DIAMONDS, &c., AND PROCESS OF MAKING THE SAME.
APPLICATION FILED NOV. 23, 1918.

1,343,977.

Patented June 22, 1920.

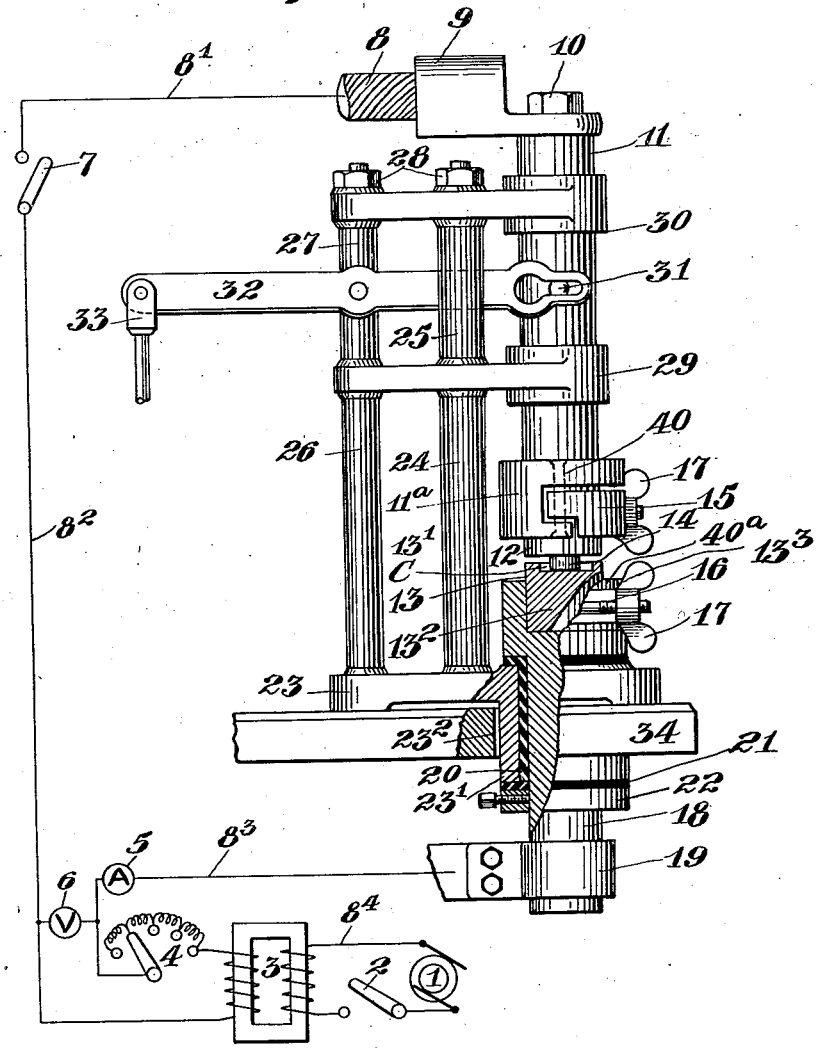

A. J. LIEBMANN AND C. A. LAISE.
HARDENED MATERIAL FOR USE IN THE ARTS AS SUBSTITUTES FOR DIAMONDS, &c., AND PROCESS OF MAKING THE SAME.
APPLICATION FILED NOV. 23, 1918.
1,343,977.
Patented June 22, 1920.
3 SHEETS—SHEET 3.
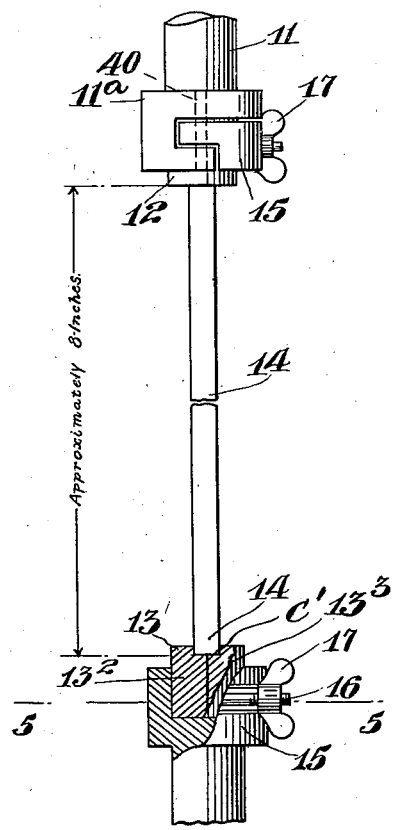
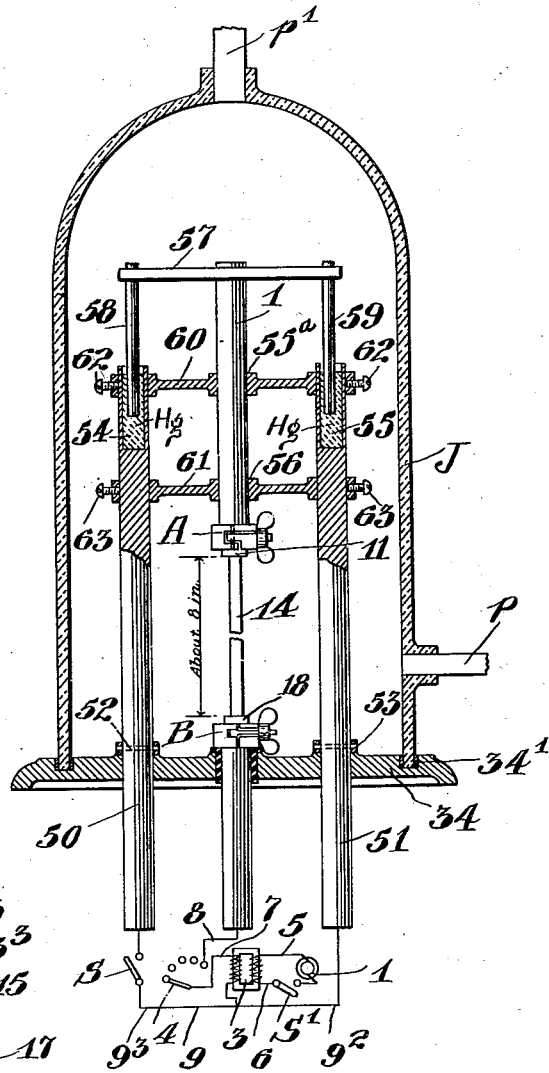
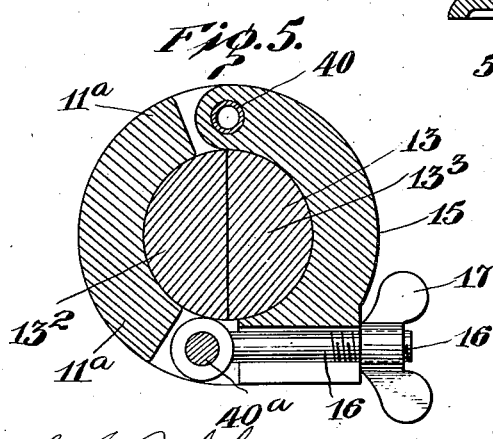

UNITED STATES PATENT OFFICE.

ALFRED J. LIEBMANN, OF NEW YORK, N. Y., AND CLEMENS A. LAISE, OF WEEHAWKEN, NEW JERSEY, ASSIGNORS, BY MESNE ASSIGNMENTS, TO INDEPENDENT LAMP AND WIRE COMPANY, INC., OF NEW YORK, N. Y., A CORPORATION OF NEW JERSEY.

HARDENED MATERIAL FOR USE IN THE ARTS AS SUBSTITUTES FOR DIAMONDS, &c., AND PROCESS OF MAKING THE SAME.

1,343,977.     Specification of Letters Patent.     Patented June 22, 1920.

Original application filed May 5, 1917, Serial No. 166,638. Divided and this application filed November 23, 1918. Serial No. 263,815.

*To all whom it may concern:*

Be it known that we, ALFRED J. LIEBMANN and CLEMENS A. LAISE, citizens of the United States, and residents, respectively, of the borough of Manhattan, city and State of New York, and Weehawken, county of Hudson, State of New Jersey, have jointly invented certain new and useful Improvements in Hardened Material for Use in the Arts as Substitutes for Diamonds, &c., and Processes of Making the Same, of which the following is a specification.

Crystallized carbon, or the diamond, is the hardest of all known substances and on account of its extreme hardness a diamond is used in the technical world in many relations where a substance of extreme hardness is required. For instance, diamonds or sapphires are used for the jewels in watch movements, and also in electrical instruments, for instance volt meters, ammeters or wattmeters. The diamond is also useful for the drawing of wires of all description and for glass cutting. It is also useful in powdered form for polishing and grinding, and as an abrasive.

Because of its rarity, the diamond is costly and it has therefore been the desire of those interested to produce the diamond artificially, and while this result has been accomplished it has only been done on a laboratory scale.

We have invented a material and a process of making the same, which material for all practical purposes may be used in the arts in the place of the pure diamond, and while it is not actually as hard as the pure diamond, it is almost as hard and can be readily produced on a large scale.

We have also invented a method of producing a number of materials which are very near the diamond and sapphire in hardness and which can be produced commercially in the different forms and shapes which are useful for application in the arts as above outlined.

As hereinabove referred to, the substances embodying our invention are very suitable for use as dies for the drawing of wire and as a substitute for the jewels of watch movements and in electrical measuring instruments, and for many other similar purposes.

The substances embodying our invention are also useful and effective for the hammering or working surfaces of hammering dies or punching dies, as plates or the working surfaces of plates where great hardness is required, for the manufacture of instruments requiring very sharp edges, and as an abrasive either alone or mixed with other substances, in powder form or compressed in the shape of plates, wheels or stones to be used as grinding stones for grinders, shapers, cutters or the like.

The principal constituent of the product of our invention is preferably the metal tungsten which in itself is a material of great hardness. Instead of tungsten, we have succeeded in making very satisfactory products by using other high fusing metals such as the metal molybdenum, or mixture or alloys of the metals tungsten and molybdenum.

In the interest of clearness the description will be limited to the refractory metal tungsten alone, it of course being understood that when tungsten is hereinafter mentioned other high fusing or refractory metals such as either molybdenum or a mixture or alloy of tungsten and molybdenum may be substituted without departing from the principle of our invention.

We have discovered that the metal tungsten, when properly prepared as hereinafter described, and cemented or carbonized, produces a material which was heretofore unknown and which has desirable properties adapting it for the uses in the arts above enumerated.

Our new alloy consists of either pure tungsten or pure molybdenum, or a mixture or alloys thereof, combined with either titanium, boron, iron, silicon, nickel, chromium, paltinum, thorium, zirconium, uranium with carbon or the oxids of the above mentioned metals with carbon, either separately or in combinations such as will be hereinafter described.

We have further discovered that the products of our invention not only serve the purposes for which they are to be used in the working of materials while cold, but also that they are especially suitable for the working of materials while hot.

The principal points of our invention relate to a process of combining the cementation and alloying of refractory materials such as tungsten or molybdenum. This may be effected by introducing into a powdered refractory metal such as tungsten or molybdenum, a powdered metal oxid and carbon or a powdered metal and carbon, then pressing up a slug or body from this mixture and subjecting it to a high temperature, preferably in a carbonaceous atmosphere, which may be created by heat treatment of the carbon present or directly, by passing carbon monoxid or carbon dioxid gas into the treating space while the electrodes are at high temperatures.

Usually when the bodies to be treated are of considerable size the operation is carried out by conducting a carbonaceous gas around the objects. If, however, the objects are small they may be placed between carbon or graphite electrodes and the heat which is generated while sending the current through them is sufficient to automatically produce a carbonaceous atmosphere.

In the reaction which takes place in these processes we have the combined effect of a carbon vapor and a metallic vapor, or an oxid vapor or both. The resulting product is due to the fact that there is cementation between the carbon and the metals, a combination between the metals and the oxids and an alloying between the metals.

The accompanying drawings show a mechanism which is useful in carrying out our process.

This application is a division of our application Serial No. 166,638, filed May 5, 1917.

Referring to the drawings in which the same reference characters indicate the same parts in the several views:

Fig. 3 is an elevation with parts broken away and other parts in section, and other parts shown diagrammatically of a treating device which may be used in practising our invention.

Fig. 4 is a detail view partly in section showing the elongated stick of material to be treated placed between the electrodes.

Fig. 5 is a cross section with parts shown in elevation on line 5—5 of Fig. 4.

Fig. 6 is a diagrammatic view illustrating a treating machine under a bell jar, which is used with longer sized slugs in carrying out our invention.

Figure 1:
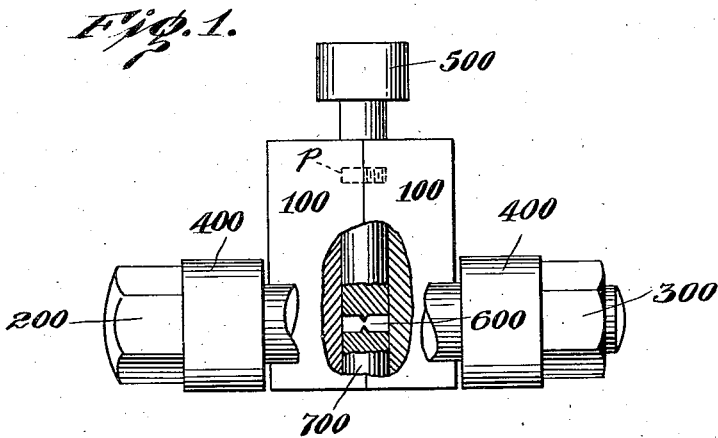
Figure 1 is a side elevation with parts broken away and others in section of a mold or press which may be utilized in carrying out our invention.
Figure 2:
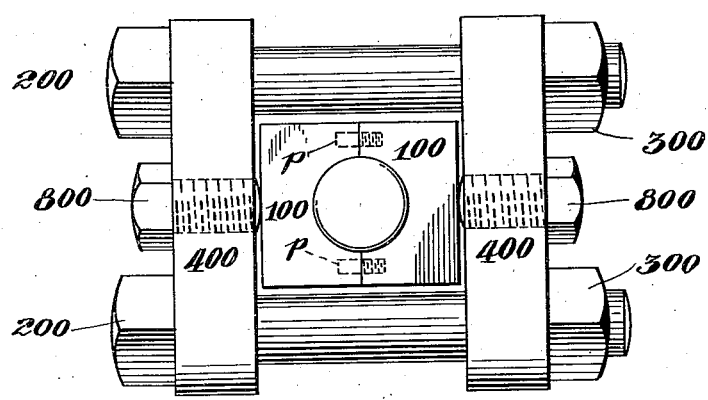
Fig. 2 is a plan view of the press shown in Fig. 1.

In the drawings, referring to Figs. 1 and 2, 100 represents the molding blocks, 400 represents cross strips arranged on either side of the blocks; 200, bolts passing through the ends of the cross strips; 300, nuts on the bolts for forcing the cross strips and the molding blocks together.

The faces of the molds are provided with semi-circular grooves which when the molding blocks are held together, form a cylindrical cavity. In the lower portion of this cavity is situated a forming key 700, and in the upper portion a pressing rod 500. A disk 600 represents the material to be compressed between the forming key 700 and the pressing rod 500. 800 represents adjusting screws impinging against the side of the block 100, and which when adjusted facilitates the removal of the pressing rod 500. Guide pins $p$ are shown in the molding blocks by means of which the blocks are held in position.

Referring to Fig. 3, 1 is an A. C. generator; 2 a switch in the primary circuit; 3 a transformer; 4 a rheostat; 5 an ammeter; 6 a volt meter; 7 a single pole switch and 8 a flexible stranded connection for the wire 8'. The circuit is completed by the wires $8^2$, $8^3$ and $8^4$ as shown. 9 is a cable lug, 10 a screw for securing it to the upper electrode holder 11, which holder slides in guides 29 and 30. A pin or rod 31 projects from the upper electrode holder into a slot in the end of the lever 32, the opposite end of which is connected to the rod 33 for connecting the lever to the treadle, not shown. The guides 29 and 30 are secured in any suitable way to standards or columns 24, 25, 26, 27, held in place by the nuts 28. The upper electrode 12 is secured in any suitable way to the electrode holder 11, as by a clamp consisting of two parts 15 and $11^a$ pivoted to each other at 40. At the opposite end of the part $11^a$ is pivoted a rod 16 at $40^a$, the rod fitting between open jaws in the end of the part 15 of the clamp, the two free ends being forced together by means of the wing nuts 17 engaging the screws on the rod 16 so as to effectually hold the electrode 12 to the electrode holder 11, all as clearly shown in Fig. 5.

18 is the lower electrode holder to which the connection 19 is secured. The holder 18 is supported upon the base 23 which in turn is supported by a table 34. Projecting from the base 23 is a portion 23' fitting through an opening $23^2$ in the table 34. 20 is an insulating sleeve between the holder 18 and the base 23. 21 is an insulating washer. 22 is a collar secured to the holder 18 to support the insulating washer. 13 is the lower electrode which is secured in place by the wing nut 17 and clamp 15, said wing nut being operative on the screw bolt 16. 14 is the disk of material to be hardened. The lower electrode is countersunk to form a cavity c so that the disk of material 14 to be hardened may be placed therein. The cavity is of sufficient diameter that the side of the electrode does not touch the sides of the disk so that as shown the disk 14 to be operated upon is held in the cavity c in the upper surface of the lower electrode 13.

In Fig. 4 the material to be operated upon is formed in the shape of a rod approximately 8" long and the rod is also held in the seat $c'$ in the lower electrode, which electrode is preferably constructed in two parts $13^2$ and $13^3$ so as to form what may be called a split electrode in order that the elements may be more easily and readily assembled. The seat $c'$ is of such dimension that the wall thereof makes contact with the rod or slug under treatment.

It is, of course to be understood that these drawings are merely illustrative and more or less conventional, showing in a general way the construction of the mold and the construction of the treating machine which we contemplate using in the carrying out of our new process and in the making of our new product.

In Figs. 4 and 6 the material to be operated upon is formed in the shape of a rod approximately 8" long and this rod is held in a seat $c'$ between the electrodes formed in two parts, which as above specified, may be termed a split electrode.

In Fig. 6 we have shown diagrammatically, the treating apparatus where a longer rod is to be treated, showing the upper electrode 11 and the lower electrode 18 which are connected together electrically as indicated, the table 34 having a groove 34' in the top thereof into which fits the edges of the bell jar J. Suitable inlet and outlet ports $p$, $p'$ are arranged in the bell jar, the lower port $p$ for the entrance of heavy gas, when used, and the upper port $p'$ being the exit port, whereas if light gas is used it enters through the upper port $p'$ and the exit port is then the lower port $p$. The plate 34, if desired, may be made of slate or any other insulating material.

The upright portions of the frame are preferably made of copper and the electrodes are also made of copper, though they may have carbon electrodes attached thereto by the clamps. The rods 50 and 51 are secured to the base 34 by pins 52 and 53. At the upper ends of these rods are cavities 54 and 55 to form cups for the reception of mercury (Hg). The electrode 11 has a cross bar 57 and two bars 58 and 59 extending downwardly therefrom at the end thereof, the ends of which are in contact with the mercury as shown. The cross arms 60 and 61 are secured by screws 62 and 63 to the frame and these arms are provided centrally thereof with holes 55 and 56 through which the electrode 11 passes.

Clamps A and B similar to those heretofore described secure the slug to be treated to the upper and lower electrodes.

Similarly to the construction illustrated in Fig. 3, 1 is an A. C. generator; 3 a transformer; 4 a rheostat. The transformer is connected by wires 5 and 6 to the generator and by wires 7 and 8 to the lower electrode. It is further connected by the wire 9 and $9^2$ and $9^3$ to the copper frame and suitable switches S and S' are placed in the circuits. The purpose of using a double frame as shown in Fig. 6 as distinguished from the single frame shown in Fig. 3 is that when the longer rods illustrated in Figs. 4 and 6 are being treated they are held more securely and evenly than if operated upon in a treating head, as shown in Fig. 3. The production of a slug is thereby permitted which is perfectly straight and which will not be bulged or curved as would be the case if treated in a machine similar to that shown in Fig. 3. The reasons for this result are that since the current is divided and passes out on both sides of the slug, as it does in the machine of Fig. 4, the lines of force generated on both sides neutralize or counteract each other and the curve or bulge of the slug, due to the electro-static effects, is thus prevented.

The articles of manufacture embodying our invention may be produced as follows:

A mixture is formed of pure tungsten powder and powder of charcoal or bone black, or a mixture of bone blank and boric acid. Certain additions, such as boron, thorium, titanium or silicon or their oxids may also be mixed with the bone black or charcoal when it is desired to use the hardened products for certain definite purposes.

The mixture as above described is then pressed up into shapes or forms, such as disks in a mold, as shown in Figs. 1 and 2, which shapes or forms are then solidified by heating process in a treating machine, such as shown in Fig. 3. The disks so treated are then drilled or otherwise shaped so as to make them suitable for use as wire drawing dies or for jewels, and they are then hardened in a specially constructed hardening head, the hardening effect being varied by the employment of different temperatures and different durations of treatment, which treatment will cause the cementation, boronizing or titanizing, etc., to take place either on the surfaces only or throughout the mass.

In preparing the powdered metal it is preferable to employ substantially pure tungsten powder produced by reduction of tungstic acid either with carbon or with hydrogen.

In pressing up the disks into sizes suitable for dies or jewels, a mold similar to that shown in Fig. 1 is employed and a pressure of 15 to 25 tons per square inch is found to be sufficient. The operation of solidifying these disks by baking and firing consists in bringing the disks slowly up to a temperature of approximately 1200 degrees C. for a period of fifteen minutes either in a vacuum or in an inert atmosphere and then to a temperature of approximately 1600 degrees C. for another period of fifteen minutes in the same way. These fired disks are then in a condition to be drilled partially or completely, depending upon whether it is desired to make jewels for scientific instruments or watches, or to make dies for wire drawing. After the disks are drilled they are further hardened between carbon or graphite electrodes. This step is very easily carried out by the use of a machine similar to that illustrated in Figs. 3 and 6, by passing an electric current therethrough as hereinafter described. To accomplish this a drilled tungsten die or jewel formed as above described or a number of them are placed between two carbon or graphite electrodes. An electric current of 500 to 700 amperes is then conducted through these products and by this means an intense white heat is obtained. While an intense heat is always sufficient to maintain a carbonaceous atmosphere around the products operated upon, yet in some cases we inclose the hardening head by a bell jar J, as illustrated in Fig. 6 and surround the heated material with an atmosphere of carbon dioxid or carbon monoxid or some other inert atmosphere as hydrogen or nitrogen. The products to be hardened are held at this white heat for a period of ten to thirty minutes, the period depending upon the degree of hardness desired and the depth of the hardened surface which we wish to obtain. If this step of heating the products to a white heat is continued for a sufficiently long period, the mass will be hardened throughout.

In order to attain disks $\tfrac{5}{16}$ths″ in diameter and from 2 to $\tfrac{3}{16}$ths″ thick, which are suitable for use as wire drawing dies, it is preferable to subject the products to the aforesaid white heat in the aforesaid hardening atmosphere for a period of ten to twelve minutes.

In cases where extreme hardness is desired we prefer to cool the dies quickly in a brine solution or in oil.

We have found that the products resulting from this process will easily scratch glass and approach the hardness of carborundum and diamonds. The hardened product which may be used either as a wire drawing die or as a jewel will then consist of an inner body of tungsten with a surface of tungsten carbid or tungsten borid, or tungsten carbid and tungsten titanid, or tungsten carbid and thorium carbid, etc., or mixtures thereof according to the materials originally employed.

The hardened products are now finished off slightly and then spun into copper or mounted into steel, or any other suitable mountings if they are to be utilized for dies for wire drawing, or they are set into small metal holders if they are to be used for jewels.

In carrying out our process we introduce directly the hardening ingredients in the proper proportions into the powdered tungsten metal and then pressing the mixture into the desired shape or form as disks or slugs. As above specified, we employ in all cases pure tungsten prepared by hydrogen or carbon reduction and mix with it a small percentage of the agents in powdered form such as carbon and boron, or carbon and thorium, or carbon and titanium, or carbid and iron, or boron and iron, or boron and iron and thorium, etc., the mixture being pressed up into the disk as shown in Figs. 1 and 3, or into the rod as shown in Figs. 4 and 6.

In making dies which are to be used in hot wire drawing or in wire drawing at high temperatures, we employ a mixture of about the following proportions:

| | |
|---|---|
| Tungsten | 91 % |
| Iron | 6 % |
| Carbon | $\tfrac{1}{4}$% |
| Thorium | $2\tfrac{3}{4}$% |

Or in some cases we use a mixture as follows:

| | |
|---|---|
| Tungsten | 92 % |
| Iron | 6 % |
| Carbon | $\tfrac{1}{4}$% |
| $TiO_2$ | $1\tfrac{3}{4}$% |

In making dies for cold wire drawing we recommend either of the following two mixtures:

| | |
|---|---|
| Tungsten | 96 % |
| $ThO_2$ | 3 % to 3.9% |
| Carbon | 0.9% to .1% |

| | |
|---|---|
| Tungsten | 96 % |
| $TiO_2$ | 3 % to 3.9% |
| Carbon | 1 % to .1% |

For the manufacture of material to be used for wire drawing dies we generally prefer to use the carbon reduced tungsten. The pressing up of the powdered material into the shapes shown in Figs. 4 and 6 is accomplished by means of the use of an ordinary pressing mold with a pressure of 15 to 30 tons per square inch. The bars weigh about 200 g., are approximately 8″ long and $\tfrac{3}{8}$″ square. After pressing, these slugs are placed into a firing furnace and subjected to a temperature of 1100 degrees C. to 1200 degrees C. for a period of 20 to 30 minutes while in an inert atmosphere or vacuum. By this means the slugs are strengthened and are then placed between electrodes and an electric current is then sent through them, the slugs being surrounded by an atmosphere of hydrogen or by a carbonaceous or inert atmosphere. If the mixture for the manufacture of dies to be used for the hot drawing of wire is used, we send a current of about 1200 amperes through the slugs, whereas if the mixture for cold wire drawing is employed, we find that it is better to use a current of about 2200 amperes for this purpose. The current is gradually increased so that the various ingredients in the bar are slowly sintered together to produce a homogeneous sintered mass. In either of the above cases the bar or slug is usually held at the maximum temperature for a period of 15 minutes. The treated slug is then cut into disks of any desired size, depending upon the use to which they are to be put. The cutting can be done by means of a thin carborundum or alundum cutting wheel revolving at a speed of 5000 to 6000 revolutions per minute.

In the manufacture of wire drawing dies, disks $\frac{1}{8}''$ and $\frac{5}{16}''$ in diameter are usually cut. When the material is to be used for jewels, the rod is first rounded off on a carborundum wheel and it is then cut into disks of any desired thickness. These hardened tungsten disks are then spun into copper blanks or mounted in steel blanks by means of steel or brass. The mounted dies or the substitute jewels are placed on automatic drilling machines and holes or cups drilled through or into them by means of tungsten or steel needles, using diamond dust or carborundum powder or tungsten carbid powder as an abrasive.

In order to obtain tools or instruments of various shapes or forms the tungsten metal powder or mixture of powders is pressed into the desired shape and then treated in a treating outfit of suitable form built and arranged on the principles outlined above for the manufacture of disks for wire drawing dies or for substitutes for jewels.

In the manufacture of an abrasive powder the material is first pressed into rods, cubes or forms of suitable size which are treated in accordance with the process hereinabove described. The material so obtained is then crushed to the desired fineness of grain and can be used either as a powder or with some binding material shaped into any desired form, such as grinding wheels, razor hones, etc.

We have found it expedient in a few cases to combine the external and internal treatments to a certain degree, that is, some of the hardening materials may be introduced directly into the powdered tungsten and the remainder used externally.

To recapitulate, our invention contemplates the hardening of the material treated (a) by an external treatment, (b) by an internal treatment and (c) by a combined external and internal treatment.

*External treatment.*—Pure tungsten metal powder is pressed up into a disk or slug, and this disk or slug is surrounded by a mixture of carbon powder and an oxid powder such as titanium oxid. When these materials are placed between electrodes and subjected to a high temperature treatment, a carbonaceous atmosphere is created by reason of the presence of the carbon powder which surrounds the tungsten slug and this carbonaceous atmosphere acts upon the tungsten and produces thereupon a superficial layer of tungsten carbid. At the same time the carbon acts upon the rare earth oxid, thus causing a partial reduction of the same and the heat is sufficient to vaporize this partially reduced material. The vapors of the same combine with the tungsten partially alloying the surface of the same, and there is thereby produced on the tungsten metal an extremely hard surface due to the combined cementation and alloying.

*Internal treatment.*—In this case a disk or slug is formed by pressing up tungsten powder with a small amount of powdered carbon and powdered iron and thorium. When this slug is subjected to a high heat treatment either in a reducing or in an inert atmosphere, the tungsten combines with the thorium and iron and the carbon cements the tungsten and iron producing carbids. The resulting product is extremely hard and refractory.

*Combined external and internal treatment.*—In the combined external and internal treatment we press up a slug formed of pure tungsten powder, iron powder, carbon powder and thorium powder and surround this pressed up slug with carbon powder and oxid powder such as boron oxid. When these materials are subjected to a high heat treatment the body is hardened throughout and yet the surface of the body is rendered still harder due to the additional exterior boronizing and carbonizing.

Molybdenum powder may be utilized in the performance of our process or in the manufacture of our products in the same manner as has been hereinabove described in relation to the use of tungsten powder.

Having now described my invention what I claim as new and desire to secure by Letters Patent is:

1. The process of producing hard materials suitable for use as wire drawing dies or as substitutes for jewels which consists in mixing with substantially pure refractory metal powder a powdered carbon, pressing the mixture into shapes, baking and then sintering the same at white heat.

2. The process of producing hard materials suitable for use as wire drawing dies or as substitutes for jewels, which consists in mixing with the powdered tungsten metal a powdered carbon, pressing the mixture into shapes, baking and then sintering the same at white heat.

3. The process of producing hard materials suitable for use as wire drawing dies or as substitutes for jewels, which consists in mixing with the powdered tungsten metal a mixture of powdered carbon and powdered rare earth oxid, pressing the mixture into shapes, baking and then sintering the same at white heat.

4. The process of producing hard materials suitable for use as wire drawing dies or as substitutes for jewels, which consists in mixing with powdered tungsten metal a powder containing carbon and powdered metal oxid, pressing the mixture into shapes, baking and then sintering the same at white heat, and cutting the product into shapes.

5. The process of producing hard materials which consists in mixing powdered tungsten metal with a powder containing carbon, pressing the mixture into shapes, and hardening the pressed shapes by subjecting them to a white heat between suitable electrodes.

6. The herein described product, which comprises a sintered body containing a mixture of substantially pure tungsten and carbon.

7. The herein described product, which comprises a sintered body containing a mixture of substantially pure tungsten, carbon and a rare earth.

8. The herein described product, consisting of a sintered body containing approximately 91 per cent. of tungsten, 6 per cent. of iron and 3 per cent. of thorium.

9. The herein described product, which comprises a sintered body containing a mixture of substantially pure refractory metal and carbon.

10. The herein described product, which comprises a sintered body containing a mixture of a refractory metal, carbon, a rare earth and a small quantity of the rare earth oxid.

11. The herein described product, which comprises a sintered body containing a mixture of tungsten, carbon, a rare earth and a small quantity of the rare earth oxid.

12. The herein described product, which comprises an inner body of tungsten with a surface containing a tungsten compound.

13. The herein described product, which comprises an inner body of tungsten with a surface containing a tungsten carbid or alloy.

14. The herein described product, which consists of small particles of a sintered mixture of substantially pure refractory metal, carbon and a rare earth.

15. The herein described product, which comprises a sintered body containing a mixture of substantially pure tungsten, iron and refractory oxid.

16. The herein described product, which consists of small particles of sintered tungsten metal powder and carbon powder.

17. The herein described product, which consists of small particles of sintered refractory metal and carbon.

18. The herein described product, which consists of small particles of sintered tungsten and carbon.

19. The herein described product, which consists of small particles of sintered refractory metal, carbon, iron, boron and thorium.

20. The herein described product, which consists of small particles of sintered tungsten, carbon, iron, boron and thorium.

21. The herein described product, which contains a sintered mixture of refractory metal, carbon, iron, boron and thorium.

22. The herein described product, which contains a sintered mixture of tungsten, carbon, iron, boron and thorium.

In witness whereof we have hereunto set our hands at the borough of Manhattan, city and State of New York, this 21st day of November, 1918.

ALFRED J. LIEBMANN.
CLEMENS A. LAISE.